United States Patent [19]

Bellhouse et al.

[11] 4,351,797

[45] Sep. 28, 1982

[54] TRANSFER MEMBRANE ASSEMBLY

[76] Inventors: Brian J. Bellhouse; Francis H. Bellhouse, both of The Lodge, North St., Islip, Oxfordshire, England

[21] Appl. No.: 198,107

[22] PCT Filed: Nov. 7, 1979

[86] PCT No.: PCT/GB79/00181
§ 371 Date: May 15, 1980
§ 102(e) Date: May 15, 1980

[87] PCT Pub. No.: WO80/00920
PCT Pub. Date: May 15, 1980

[30] Foreign Application Priority Data

Nov. 8, 1978 [GB] United Kingdom ............... 43618/78

[51] Int. Cl.$^3$ ......................... A61M 1/03; B01D 31/00
[52] U.S. Cl. .................................... 422/48; 210/321.3
[58] Field of Search ............... 210/321.3, 321.4, 321.5, 210/456; 422/48

[56] References Cited

U.S. PATENT DOCUMENTS

| 3,034,505 | 5/1962 | Sobol | 210/321.4 X |
| 3,511,381 | 5/1970 | Alwall et al. | 210/321.3 |
| 3,989,626 | 11/1976 | Bentley et al. | 210/321.4 X |
| 4,017,351 | 4/1977 | Larson et al. | 156/498 X |
| 4,075,091 | 2/1978 | Bellhouse | 210/321.4 X |
| 4,111,659 | 9/1978 | Bowley | 210/321.5 X |
| 4,173,537 | 11/1979 | Newhart | 210/321.3 |

FOREIGN PATENT DOCUMENTS

| 1259362 | 1/1968 | Fed. Rep. of Germany | 210/321.3 |
| 2525480 | 12/1976 | Fed. Rep. of Germany | 210/321.3 |
| 2267814 | 11/1975 | France | 210/321.3 |
| 1442754 | 7/1976 | United Kingdom | 210/321.3 |

Primary Examiner—Frank A. Spear, Jr.
Attorney, Agent, or Firm—Murray and Whisenhunt

[57] ABSTRACT

A conduit assembly (23) for an artificial lung is formed from two sheets (30) of thermoplastic transfer membrane material which are sealed together along sinuous lines (24) to provide a unitary assembly of tubular conduits (26) each having longitudinally spaced hollows (27) which promote eddies in, and mixing of, blood when passed through the conduits with a pulsatile flow.

14 Claims, 4 Drawing Figures

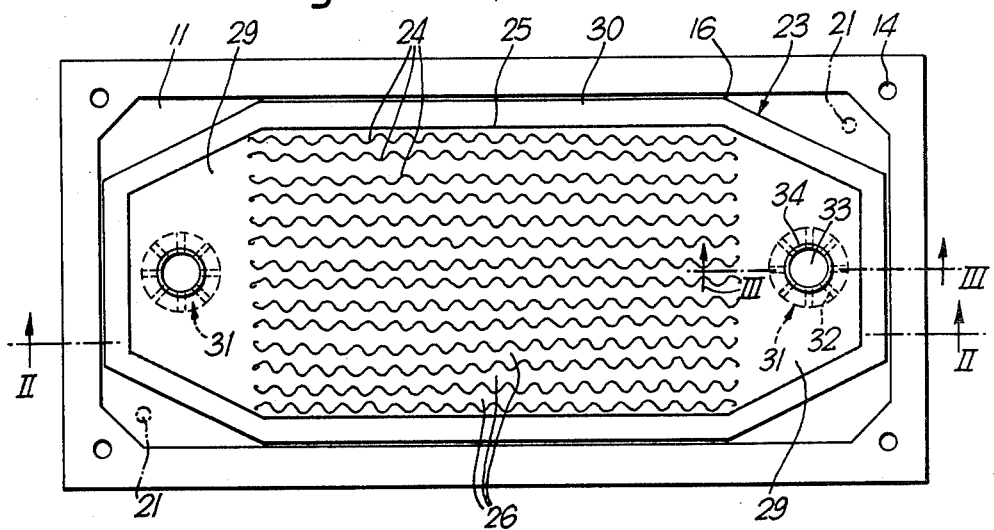
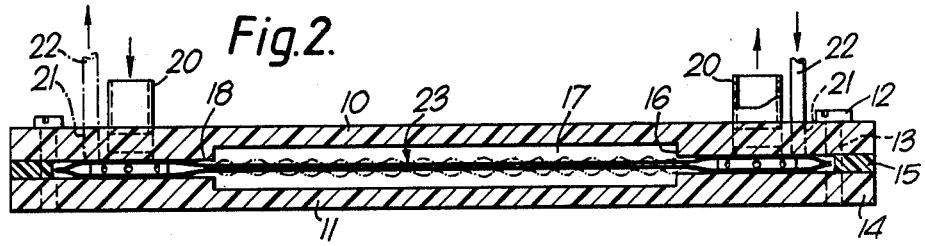
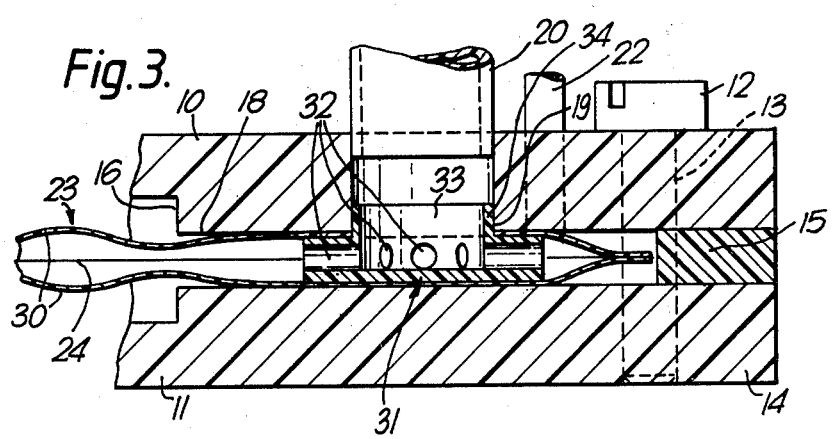

TRANSFER MEMBRANE ASSEMBLY

The invention is concerned with apparatus for effecting transfer of heat or mass between two fluids, of which at least one is usually a liquid, through a transfer membrane. Such apparatus is used in blood oxygenators, that is artificial lungs, and dialysers, such as artificial kidneys, in which case one fluid is blood, and the other is oxygen or dialysate. In practice the efficiency of the transfer across the membrane is limited by the extent to which the total volume of fluid can be brought into close proximity with the membrane. It is not sufficient to reduce the thickness of the fluid layers, by reducing the thickness of the conduits in which they flow, as this increases undesirably the pressure drop across the apparatus and leads to uneven perfusion and regions of stagnation, which, in the case of blood, provides a danger of thrombosis.

We believe that the proper solution lies in so shaping the fluid flow conduits that significant mixing of the fluid occurs within the conduits. It has previously been proposed in British patent specification No. 1,422,754 to provide an apparatus comprising a conduit for flow of one of the fluids at least partially defined by the membrane, a transverse dimension of the conduit varying in a regularly repeating manner along the length of the conduit, to provide a multiplicity of hollows in the membrane, the apparatus also comprising means communicating with the conduit for passing fluid through the conduit in pulsatile flow, the arrangement being such that pulsation of fluid past the hollows give rise in the hollows to rotational fluid flow having components of motion parallel and perpendicular to the general direction of flow in the conduit of the fluid. Such apparatus is hereinafter referred to as of the kind described.

The conduit may be defined between two predominently planar surfaces, so that it has an elongate cross section transverse to the general direction of flow through the conduit, at least one of the surfaces then being provided by a membrane in which the requisite hollows are provided by furrowing at least one of the surfaces defining the conduit. Alternatively, the conduit may be tubular, that is essentially axisymmetric with its wall provided by a membrane. Tubular conduits have the advantage of being self supporting and do not require complex moulded support plates. However, they have not been cheap to produce in the numbers required in a typical apparatus.

In accordance with the present invention, a conduit assembly for use in an apparatus of the kind described comprises two sheets of plastics material, at least one of which is a transfer membrane material, which are sealed together face to face along a number of pairs of sinuous lines extending generally in the same direction alongside one another with the undulations of the lines of each pair of lines out of phase with one another thereby providing, upon inflation of the passageways between the sheets and between each pair of lines, a tubular conduit with longitudinally and substantially regularly spaced hollows with intervening constrictions.

In this manner there is readily provided a unitary construction consisting of a generally planar array of tubular conduits, with walls of transfer membrane material, and of the required internal configuration.

If the undulations in the adjacent lines of each adjacent pair of lines are also out of phase with one another, a tubular conduit with the required internal configuration will also be provided between each adjacent pair of lines with the annular hollows in one conduit in lateral alignment with the constrictions in each adjacent conduit. This layout provides maximum saving of space and material.

The unitary structure comprising the array of conduits may also incorporate fluid inlet and outlet manifolds by providing additional lines of sealing which define between the two sheets spaces communicating with respective ends of the conduits.

Inlet and outlet passages to the respective manifold spaces may also be provided between the two sheets by means of further seal lines. However, a preferred way of leading fluid into or out of at least one of the manifolds is by the provision of a distributor which is sealed to and between the two sheets in the manifold, the distributor having a passage which opens, in use, through at least one of the sheets and into the respective manifold. In order to keep the interior of the assembly clean, prior to use, it may be manufactured with the distributor between imperforate sheets and a hole cut through at least one of the sheets in alignment with the passage in the distributor immediately prior to use.

In use, one or a stack of the unitary assemblies of tubular conduits will be provided within a housing and connected to appropriate pumping arrangements so that one fluid can be pumped through the conduits in parallel with a pulsatile flow and the other fluid will be pumped through the housing around the assembly or assemblies in contact with the transfer membrane material. The second fluid will preferably flow in countercurrent or crosscurrent to the first fluid through the housing. When a stack of the assemblies are used and the assembly manifolds have the distributors referred to, the passages of the distributors of the corresponding assembly manifolds may be sealed to one another to provide a continuous passage leading to or from all the assemblies.

The plastics material from which each of the two sheets of the conduit assembly is made will be of a suitable hygienic grade when the assembly is for use in a medical application. The plastics material will usually be a thermoplastic material, i.e. one which softens upon being heated and then resets upon cooling, such as polypropylene, polyethylene or polytetrafluoroethylene (PTFE). The seal lines may then be produced by heat sealing, for example by direct application of a hot die or by an ultrasonic welding tool. Alternatively a solvent weld may be possible.

In order to inflate, and preferably set, the walls of the tubular conduits in their desired configuration, the conduits may be inflated by being filled with a fluid, preferably a liquid, under a pressure sufficient to stretch the sheet material just beyond its elastic limit. After this treatment the tubular conduits adopt a cross section throughout which is substantially circular. It may be possible to carry out the inflation step more quickly using heated air under pressure.

In order that the conduits are set in a shape in which the transition between the annular constrictions and hollows is smooth, the conduits are preferably longitudinally stretched, for example by being clamped in a frame, or indeed in the final housing in which they are to be used, during the setting. Some appropriate sheet materials are produced with the facility for stretching more easily in one direction than in the perpendicular direction. It is desirable to use such material with the direction of easier stretching extending substantially parallel to the lengths of the tubular conduits.

An example of an artificial lung incorporating a conduit assembly in accordance with the invention is illustrated in the accompanying drawings, in which:

FIG. 1 is a plan with a cover of the artificial lung removed;

FIG. 2 is a section taken on the line II—II in FIG. 1 through the artificial lung with the cover in place;

FIG. 3 is a section taken on line III—III in FIG. 1 but to a scale larger than that of FIG. 2; and, FIG. 4 is a perspective view of the conduit assembly with parts broken away.

Figure 4:
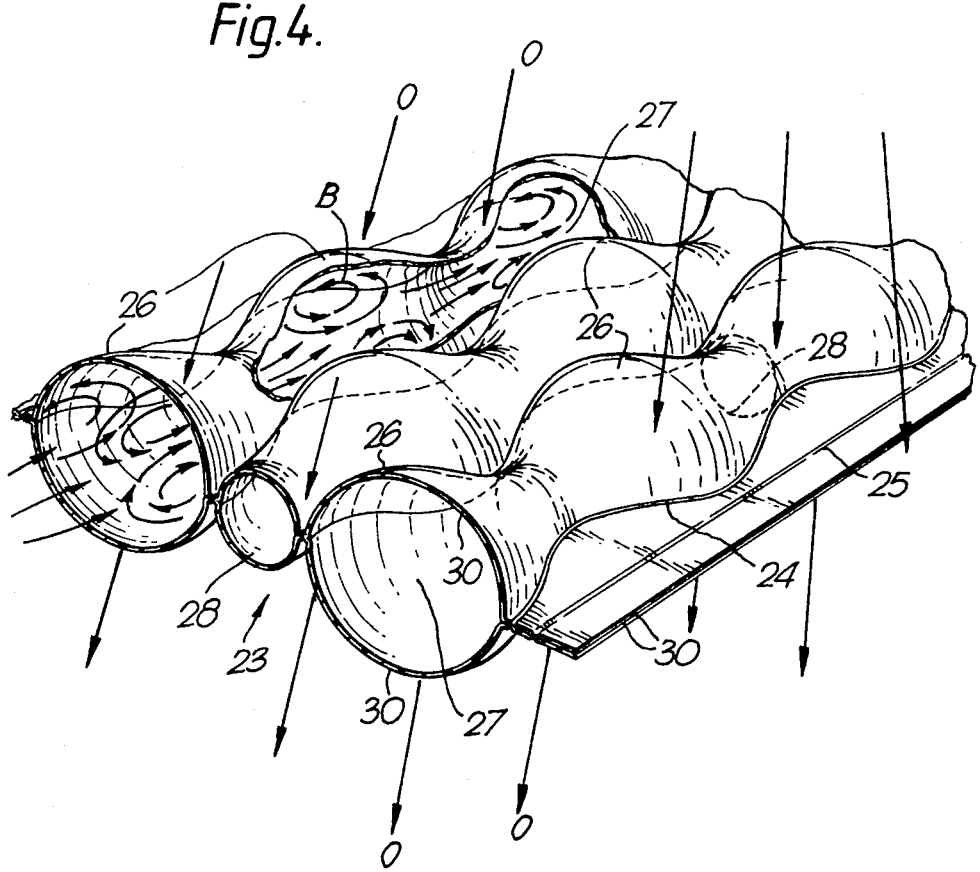

The illustrated artificial lung has a rectangular housing formed by a cover 10 and base 11 which are of similar shape and which are secured together at their corners by screws 12 which pass through the holes 13 in the cover and screw into tapped holes 14 in the base. A sealing gasket 15 is interposed between the edges of the cover 10 and base 11 to seal a chamber within the housing. The inner surfaces of the cover and base are stepped at 16 so that the chamber within the housing consists of a central portion 17 of greater depth, and, at each end, portions 18 of lesser depth.

The cover 10 is provided centrally at each end with a larger opening 19 to which external hoses 20 are coupled, and, at diagonally opposite positions, smaller openings 21 to which external hoses 22 are fitted.

The housing contains a conduit assembly 23 in the shape of an elongate octagon. The assembly is formed by two sheets 30 of microporous polytetrafluoroethylene membrane material of a kind sold under the trade name Gore-tex which are heat sealed together along a number of generally parallel but sinuous lines 24 and along a peripheral octagonal line 25. The lines 24 define between them, and between the two membrane sheets a side by side array of tubular conduits 26 which, when the conduits are expanded, are of circular section and repeatedly increasing and decreasing diameter, thereby providing a series of longitudinally spaced hollows 27 separated by constrictions 28. It will be appreciated that the hollows and constrictions of adjacent conduits 26 are out of phase with one another so that they nest together and are joined along the sinuous lines 24 which remain substantially coplanar. The maximum diameter of each conduit 26, in each of its hollows, is substantially 5 mm. and the pitch between adjacent hollows is a similar dimension.

At each end of the conduit assembly, the peripheral seal line 25 defines, between the membrane sheets, and in communication with the adjacent ends of the conduits, inlet and outlet manifolds 29 of rhombic shape. Within each manifold is positioned a rigid annular distributor 31 made from a plastics material such as polycarbonate, heat sealed to the inner faces of the two membrane sheets. The distributor has a series of radial ports 32 opening into the respective manifold from a central passageway 33 through the distributor. On one face the distributor has a projecting annular flange 34, in alignment with the passage 33 and extending through a hole in the upper membrane sheet of the conduit assembly into the adjacent passage 19. The extension of these flanges 34 into the two openings 19 locates the conduit assembly in the housing and the fixing is completed by the distributors 31 with the membrane sheets above and below, being clamped between the cover 10 and base 11, thereby determining the narrower depth of the chamber portions 18.

In use the hose 20 at the left hand end of the housing as shown in FIGS. 1 and 2 will be connected to a blood supply which is pumped to the artificial lung with a pulsatile flow, for example by means of a unidirectional roller pump in series with a reciprocatory pump. Similarly the hose 20 at the right hand end as seen in FIGS. 1 and 2 will be connected to the return blood circuit. Blood will thus flow in through the left hand hose 20, through the left hand distributor 31, and the inlet manifold 29, in parallel through the conduits 26, into the outlet manifold 29 and through the outlet distributor 31 and the right hand outlet hose 20. The blood flows with a mean flow velocity through the conduits 26 but the superimposed reciprocatory component causes the blood alternately to accelerate and decelerate and this sets up eddies B in the hollows 27, as shown in FIG. 4. These promote intimate mixing of the blood and contact between the blood and the transfer membranes.

At the same time oxygen is pumped in a steady stream through the oxygen inlet hose 22 at the right hand end of the housing as seen in FIGS. 1 and 2, essentially diagonally through the housing in contact with the outside of the conduit assembly 23, and out of the oxygen outlet hose 22 at the left hand end of the housing. The oxygen O thus flows partly in crosscurrent and partly in countercurrent to the blood and good transfer occurs through the membrane walls of the conduit assembly 23.

In vitro tests of the lung have been carried out using sheep blood. The blood was pumped at a mean flow rate of 75 ml. per min. with a superimposed reciprocatory component using a reciprocatory pump with a stroke volume of 1.3 ml. and a pulse frequency of 200 per min. Oxygen transfer rates reached 200 ml./min.m$^2$. The surface area of the artificial lung was 106 cm$^2$.

The same artificial lung was tested in a live sheep, in veno-venous bypass using cannulae in the external jugular veins. At a mean blood flow rate of 75 ml/min. the lung raised the oxygen saturation of the blood from 63% at the inlet to 83% at the outlet, achieving oxygen transfer rates of 226 ml/min.m$^2$.

Clearly the depth of the housing could be increased to accommodate two or more of the conduit assemblies stacked together, in which case the annular flanges 34 on the distributors of the lower assemblies would project up through holes in the lower membrane sheets of the assemblies above and project into and be sealed within the lower ends of the passages 33 of the assemblies above. Single supply and return lines of blood would then be provided for all the assemblies in the stack.

The illustrated conduit assembly is produced by cutting two sheets to the appropriate elongate octagonal shape, and placing them face to face on a heat sealing die formed by a number of upstanding metal strips corresponding in shape to the lines 24 and 25. The metal strips are embedded in rubber or asbestos substrate and connected into an electrical heating circuit. The sheets are then covered by a soft pad to press the sandwiched sheets down against the die and heating current is passed through the metal strips in turn. Each pair of sinuous lines require sealing for about 2 to 3 seconds utilizing a power of 170 watts. After all the lines of heat sealing have been set, the assembly is pressurized with water at about 16° C. and a superatmospheric pressure of about 15 psi. This is sufficient to inflate the conduits 26 and indeed stretch the membrane sheet material just beyond its elastic limit so that, upon subsequent depressurisation, the conduits maintain their tubular shape with smooth transition between the hollows and constrictions. During the inflation step, the assembly is stretched parallel to the lengths of the conduits 26 either on a frame or possibly simply by locating the assembly in the illustrated housing by means of the distributors 33 and the clamping pressure in the region of the distributors.

We claim:

1. In an apparatus for transferring heat or mass between two fluids, said apparatus comprising at least one first conduit having a feed end and a discharge end and defined at least in part by a transfer membrane, first feed means for feeding a first fluid to said first conduit feed end, first discharge means for discharging the first fluid from the said first conduit discharge end, housing means at least in part surrounding said first conduit and defining a second conduit, having a feed end and a discharge end, for a second fluid flowing in contact with said transfer membrane, second feed means for feeding the second fluid to the second conduit feed end, and second discharge means for discharging the second fluid from the second conduit discharge end, the improvement comprising said first conduit comprising two sheets of plastics material, at least one of which is a transfer membrane material, which are sealed together face to face along a plurality of sinuous lines extending generally in the same direction alongside one another with the undulations of each adjacent pair of lines out of phase with one another thereby providing, upon inflation of the passageways between the sheets and between respective adjacent pairs of lines, a plurality of nested tubular conduits, separated by common seal lines, each with longitudinally and substantially regularly spaced hollows with intervening constrictions, in a side-by-side array.

2. In an apparatus for transferring heat or mass between two fluids, said apparatus comprising at least one first conduit having a feed end and a discharge end and defined at least in part by a transfer membrane, first feed means for feeding a first fluid to said first conduit feed end, first discharge means for discharging the first fluid from the said first conduit discharge end, housing means at least in part surrounding said first conduit and defining a second conduit, having a feed end and a discharge end, for a second fluid flowing in contact with said transfer membrane, second feed means for feeding the second fluid to the second conduit feed end, and second discharge means for discharging the second fluid from the second conduit discharge end, the improvement comprising said first conduit comprising two sheets of plastics material, at least one of which is a transfer membrane material, which are sealed together face to face, wherein the sheets are sealed together along a plurality of pairs of sinuous lines extending generally in the same direction alongside one another with the undulations of the lines of each pair of lines out of phase with one another thereby providing, upon inflation of the passageways between the sheets and each pair of lines, a tubular conduit with longitudinally and substantially regularly spaced hollows the intervening constrictions, the undulations of adjacent lines of each adjacent pair of lines also being out of phase with one another to provide further tubular conduits between each adjacent pair of lines, with adjacent tubular conduits being in a nested side-by-side array and separated by a common seal line.

3. An apparatus according to claim 2, in which the two sheets are sealed together along additional lines (25) defining between the two sheets spaces communicating with respective ends of the conduits to act as fluid inlet and outlet manifolds (29).

4. An apparatus according to claim 3, in which in at least one of the manifolds (29) there is provided a distributor (31) sealed to and between the two sheets, the distributor having a passage (32,33) which opens, in use, through at least one of the sheets and into the respective manifold for leading fluid into or out of the apparatus.

5. An apparatus according to claim 2, in which the plastics material from which each of the two sheets (30) is made is a thermoplastic material.

6. An apparatus according to claim 5, in which the lines (24,25) are lines of heat sealing.

7. A method of making a first conduit assembly according to claim 5, in which, after the two sheets have been sealed together along the lines, the tubular conduits are inflated by being filled with a fluid under a pressure sufficient to stretch the sheet material just beyond its elastic limit.

8. A method according to claim 7, in which, whilst being subjected to the inflation step, the first conduit assembly is stretched in the longitudinal direction of the tubular conduits.

9. A method of making a first conduit assembly according to claim 2, in which, after the two sheets (30) have been sealed together along the lines (24), the tubular conduits are inflated by being filled with a fluid under a pressure sufficient to stretch the sheet material just beyond its elastic limit.

10. A method according to claim 9, in which, whilst being subjected to the inflation step, the first conduit assembly is stretched in the longitudinal direction of the tubular conduits.

11. A method according to claim 10, in which the sheets are made of a plastics material which is more easily stretched in one direction than in the perpendicular direction, the direction of easier stretching being substantially parallel to the longitudinal direction of the tubular conduits.

12. An apparatus of claim 2 further including means for passing the first fluid with a pulsatile flow through the first conduits; and means for passing the second fluid through the second conduit in contact with the transfer membrane.

13. A conduit assembly for use in an apparatus for transferring heat or mass between two fluids, said apparatus comprising at least one first conduit having a feed end and a discharge end and defined at least in part by a transfer membrane, first feed means for feeding a first fluid to said first conduit feed end, first discharge means for discharging the first fluid from the said first conduit discharge end, housing means at least in part surrounding said first conduit and defining a second conduit, having a feed end and a discharge end, for a second fluid flowing in contact with said transfer membrane, second feed means for feeding the second fluid to the second conduit end, and second discharge means for discharging the second fluid from the second conduit discharge end, wherein said first conduit is an assembly of conduits comprising two sheets of plastics material, at least one of which is a transfer membrane material, which are sealed together face to face, wherein the sheets are sealed together along a plurality of pairs of sinuous lines extending generally in the same direction alongside one another with the undulations of the lines of each pair of lines out of phase with one another thereby providing, upon inflation of the passageways between the sheets and each pair of lines, a tubular conduit with longitudinally and substantially regularly spaced hollows with intervening constrictions, the undulations of adjacent lines of each adjacent pair of lines also being out of phase with one another to provide further tubular conduits between each adjacent pair of lines, wherein adjacent tubular conduits, separated by a common seal line, are in a nested side-by-side array.

14. A method of making a first conduit assembly according to claim 13, in which, after the two sheets have been sealed together along the lines, the tubular conduits are inflated by being filled with a fluid under a pressure sufficient to stretch the sheet material just beyond its elastic limit.

* * * * *